April 19, 1949. H. CARSON ET AL 2,467,964
PROPELLER MECHANISM
Filed Jan. 15, 1945 4 Sheets-Sheet 1

INVENTOR
Howard Carson
BY Morris J. Duer
Spencer Hardman & Fehr
their ATTORNEYS

April 19, 1949.     H. CARSON ET AL     2,467,964
PROPELLER MECHANISM
Filed Jan. 15, 1945     4 Sheets-Sheet 2
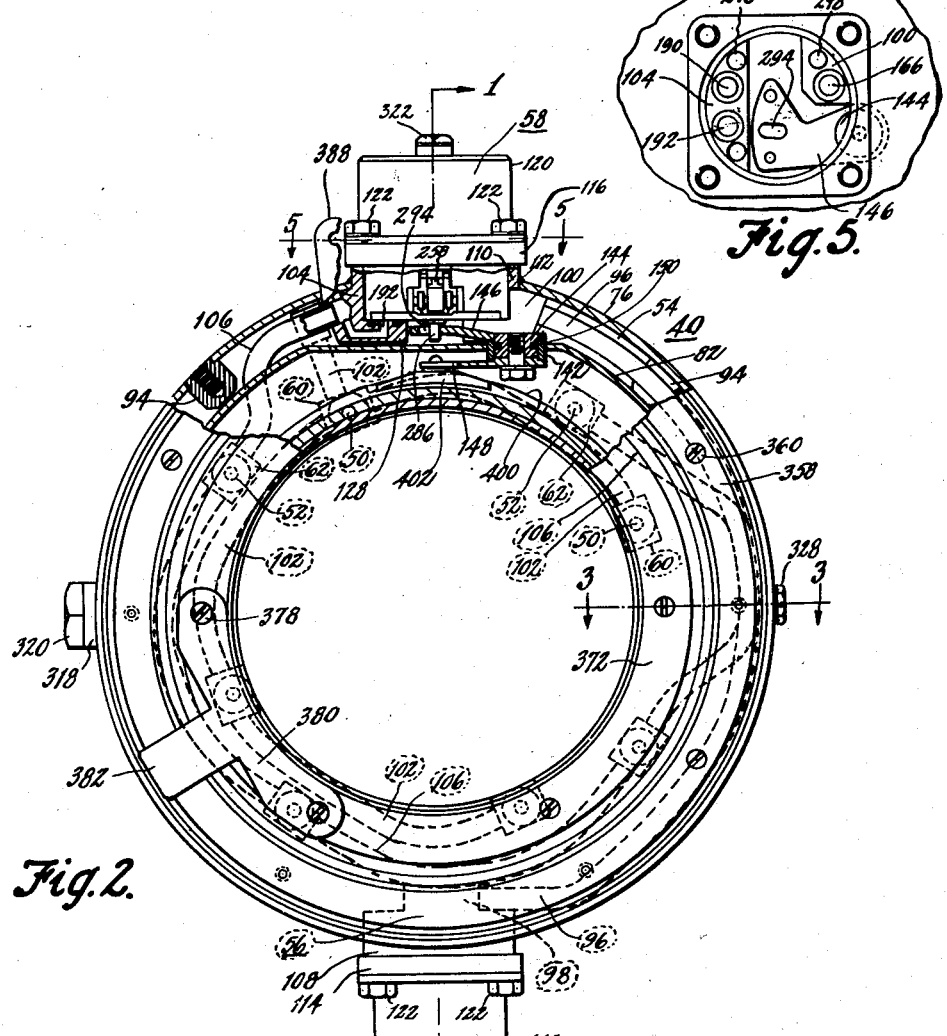
Fig.2.
Fig.5.
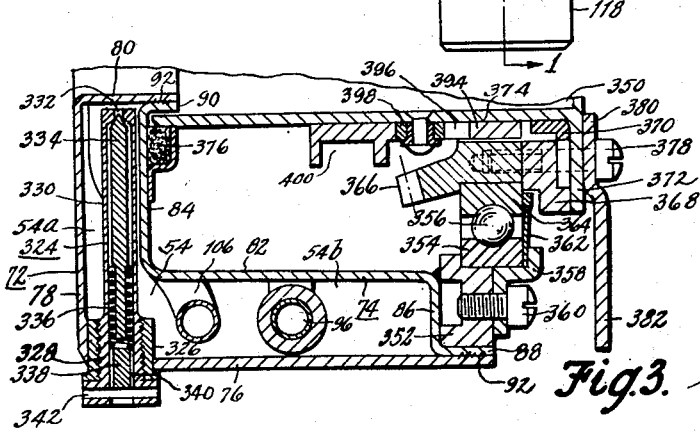
Fig.3.
INVENTOR
Howard Carson
Morris J. Duer
BY
ATTORNEYS April 19, 1949.  H. CARSON ET AL  2,467,964
PROPELLER MECHANISM Filed Jan. 15, 1945  4 Sheets-Sheet 3

INVENTOR
Howard Carson
Morris J. Duer
BY
ATTORNEYS

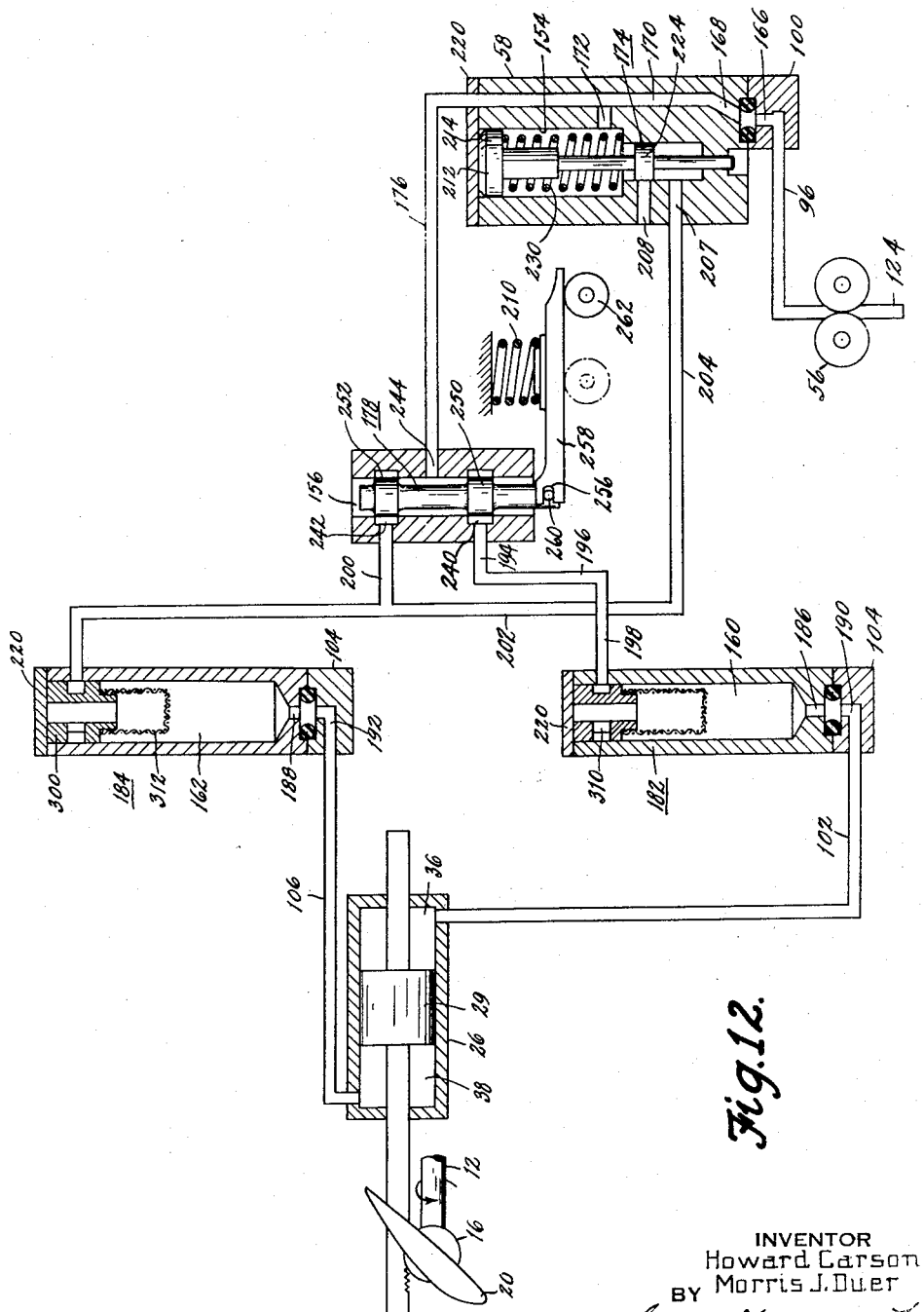

Patented Apr. 19, 1949

2,467,964

UNITED STATES PATENT OFFICE 2,467,964

PROPELLER MECHANISM

Howard Carson and Morris J. Duer, Dayton, Ohio, assignors to General Motors Corporation, Detroit, Mich., a corporation of Delaware Application January 15, 1945, Serial No. 572,848

15 Claims. (Cl. 60—52)

This invention relates to controllable pitch propellers for aircraft and has for an object to simplify the construction of regulators for fluid circuits.

One of the particular objects of the invention is to provide a regulator made up from formed steel members united to form a sealed fluid reservoir.

Another object of the invention is to provide a regulator mechanism that will be of little mass, and easily fabricated by production line methods.

Another object of the invention is to provide a regulator mechanism in which the units of fluid circuit control are mountable from the exterior of the reservoir, and in which there is a minimum of outside controls or actuators.

Another object of the invention is to provide a compact valve assembly for fluid circuits, susceptible of speedy replacement, and generally housed by a circumferentially disposed and radially extending capsule forming part of the sealed reservoir.

Another object of the invention is to provide a sealed regulator shell with built-in tubage connections and orifices, and control-unit sockets, with control units of compact form mounted in the sockets and having definite passages matable with the orifices of the shell.

A still further object of the invention is to provide a fluid circuit control-unit adapted for capsule mounting in a regulator housing, the unit including a pressure control valve, a fluid distributing valve and a pair of control passages with filter devices hydraulically connected between a fluid pressure source port and a pair of control ports.

Other objects and advantages of the present invention will be apparent from the following description, reference being had to the accompanying drawings wherein a preferred embodiment of the present invention is clearly shown.

In the drawings:

Fig. 2 is a cross sectional view through the regulator with parts shown in elevation substantially as indicated by the lines and arrows 2—2 of Fig. 1.

Fig. 3 is an enlarged sectional view through the regulator and breather valve, substantially as indicated by the line and arrows 3—3 of Fig. 2.

Fig. 5 is a plan view of the socket adapted to house the control valve assembly, substantially as indicated by the line and arrows 5—5 of Fig. 2.

Fig. 12 is a schematic view of the propeller control elements adapted to a fluid circuit for controlling the pitch of the blades.

Figures 1, 4:
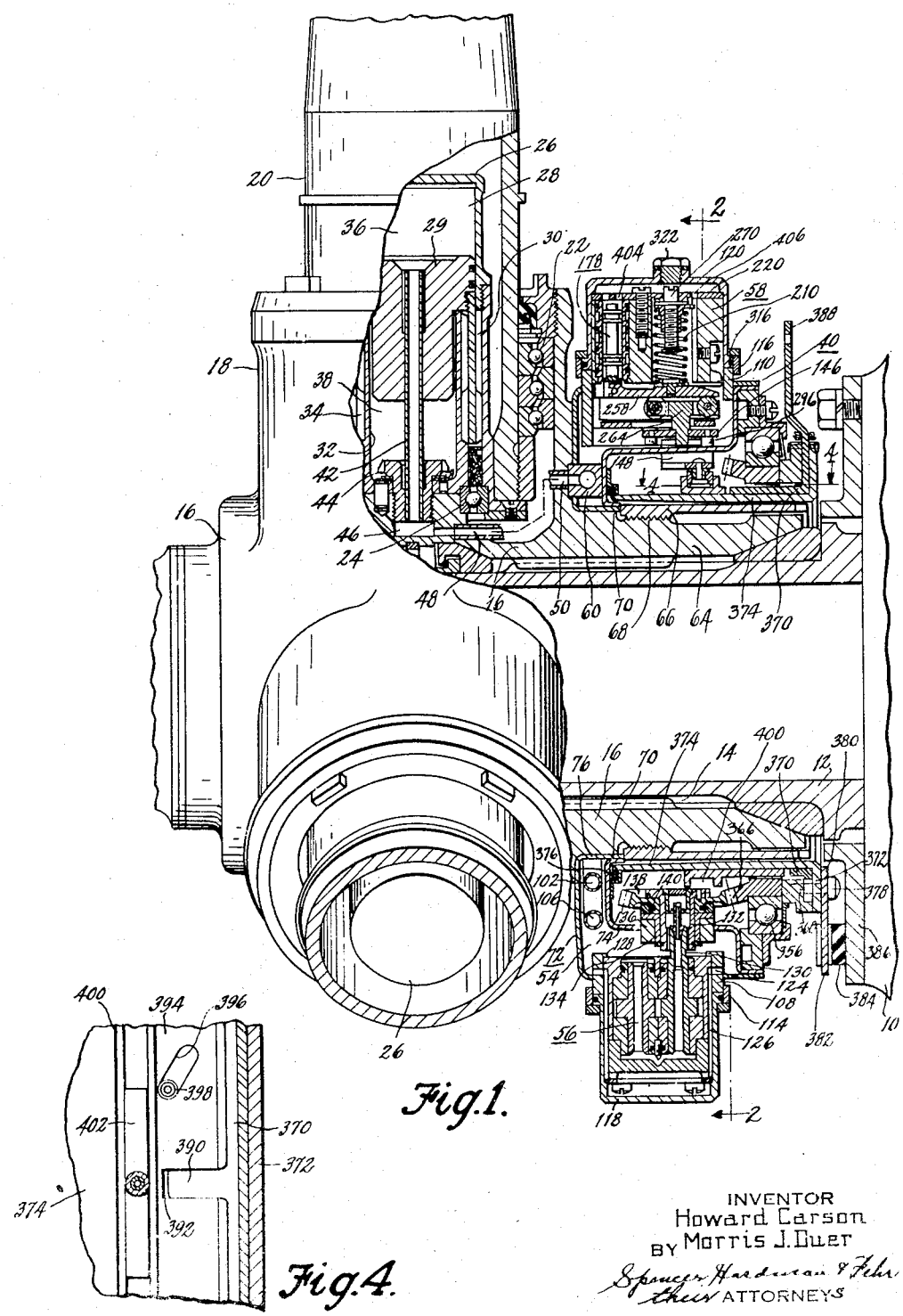
Fig. 1 is an elevational view with parts in section illustrating an adaptation of the instant invention. It is a view substantially as indicated by the line and arrows 1—1 of Fig. 2.
Fig. 4 is a detailed view of the control linkage substantially as indicated by the line and arrows 4—4 of Fig. 1.

Referring specifically to the drawings, 10 indicates an engine nosing or gear casing of an aircraft from which extends in rotatable relation an engine driven propeller shaft 12 provided with splines 14 for driving a propeller hub 16 that provides a plurality of propeller blade sockets 18 journalling blades 20 for pitch shift movement. For shifting the blades in pitch, they are mounted in the sockets by bearings 22 and 24, and enclose torque units 26 in the form of cylinders 28 rigidly coupled to the blades and enclosing pistons 29 splined thereto at 30 and to a fixed spindle 32 at 34. The cylinder is thereby divided into a pair of opposed fluid pressure chambers 36 and 38 each of which is provided with fluid passages leading to a regulator 40 as is now usual in the art and particularly described in the patent to Blanchard et al. 2,307,101. Thus, a tube 42 secured in a clamp bolt 44 extends as a guide through the piston 29 to open into the chamber 36, while the inner end opens into a chamber 46 from which leads a transfer tube 48 anchored in the side of the socket 18, to end in an orifice 50. Similar fluid connections from the chamber 38 may end in an orifice 52 in the side of the socket. The structure is such that fluid pressure directed through the orifice 50 effects radially inward movement of the piston 29 for a decreasing pitch shift with a consequential outflow from the chamber 38 through the orifice 52, while directed application of pressure to the orifice 52 effects an increase pitch shift of the blades.

Directed application of pressure to the torque unit is controlled by the regulator 40 which embraces a fluid reservoir 54, houses a pressure creating means or pump 56, and a compact control valve assembly 58. The regulator is of annular form and is secured on the hub 16 concentric with the shaft 12 so that porting blocks 60 and 62 register with the orifices 50 and 52, of the hub. That is made possible by means of a sleeved extension 64 extending aft of the hub and about which the regulator is centered, and a sleeve nut 66 threaded to the hub sleeve at 68 and abutting a flange or part 70 of the regulator 40. The regulator housing per se forming the reservoir 54 is made up of concentric drawn or spun steel members 72 and 74, both angular in cross section so that when fitted together they form an annular chamber therebetween of L-section including the radial portion 54a and the cylindrical portion 54b thereby rendering the reservoir 54. The member 72 has a cylindrical wall 76 integrally joined to a planar wall 78, and at the inner edge of which is a short flange 80 of an inside diameter to slide over the sleeve extension 64 of the hub. The member 74 has a cylindrical wall 82 and planar wall 84 parallelly disposed with respect to like walls of the member 72, and in addition thereto has a radially outward extending rim 86 joining an outer cylindrical flange 88, as well as an inward cylindrical flange 90, the flanges being dimensioned to closely fit within the parts 76 and 80 of the member 72. When so adjusted they are solidly joined in a fluid sealed relation by welding or brazing as indicated at 92.

Before assembly of the members forming the reservoir 54 the members will have been fitted with the elements necessary to provide fluid connection with the torque units and with the tubage assembly connecting the control apparatus. That includes the porting blocks 60 and 62 that are located at proper points along the planar wall 78 and that also act as spacers for locating the members and limiting the amount of telescoping movement of the members 72 and 74 when they are assembled. Like spacers for concentricity of the parts are provided by the balance anchoring blocks 94 secured in the cylindrical wall of the member 72. The tubage assembly includes a pressure supply conduit 96 anchored in a porting block 98 located adjacent a pump station and extending around the side of the member 72 to a porting block 100, while a control passage 102 for the decrease pitch pressure application connects all of the porting blocks 60 in the wall of the member 72 and leads to a porting block 104. A second control passage 106 connects all of the porting blocks 62 and leads to the same porting block 104 which is located adjacent the station for the control valve assembly as is also the porting block 100. They are so shown in Fig. 5.

At diametrically opposite points of the regulator casing stations are provided for mounting of the pump and control valve assembly. The stations are defined by tubular nipples 108 and 110 secured in the cylindrical wall 76 of the housing and arranged with their axes on a radius of the axis of propeller rotation. When welded or brazed in position as indicated at 112 they form sockets adjacent the porting blocks for reception of the active elements of the control apparatus. Rabbetted flanges 114 and 116 on the outer ends of the nipples operate to seat and orient the units 56 and 58 while flanged cap members 118 and 120 complete the capsule enclosing the units, and are held in fluid tight relation by screw devices 122. Within the capsule formed by the nipple 108 and cap 118, there is located the pump 56, provision being had by openings 124 through the wall of the nipple and grooves 126 of the pump body for the fluid intake of the pump, the outlet of which opens to the porting block 98 and thence by the piping 96 to the porting block 100 at the station for the control valve assembly. The control valve assembly mounts within its capsule formed by the nipple 110 and cap 120 in a similar manner since it is inserted within the nipple until it engages a flange 128 formed on the inner end of the nipple, or may involve a part of the porting block or blocks at the particular station. Locating means are provided by which the unit may be seated in but one angular position within the nipple, and in which the fluid ports are properly aligned with the ports to the tube elements connected with the porting blocks. In the instance of the pump unit 56, its driving shaft 130 has a splined or like driving engagement with a sleeve shaft 132 journalled in a bushing 134 carried by a nipple 136 secured in the inner wall 74 of the regulator housing. A pinion 138 secured to the sleeve shaft 132 affords a driving means for the pump and is maintained with a leak-proof joint by a seal ring 140. Actuating means for the control of the valve unit is also mounted on the inner wall of the regulator housing and comprehends a nipple 142 within which is journalled a shaft 144 to opposite ends of which there are drivingly fixed arms 146 and 148. A seal ring 150 prevents leakage through the bearing of pressure fluid from the reservoir 54.

The control valve assembly 58 is a compact unit incorporating all of the valving mechanism and movable or active elements entering into the regulation of the fluid circuit. For detailed description, reference is now made to Figs. 6 to 11 inclusive, where 152 refers to a body of cylindrical form fitting within the nipple 110, and having a plurality of longitudinally extending bores 154, 156, 158, 160 and 162 for housing various of the elements of the control apparatus. Other bores and drillways both longitudinally extending and crosswise thereof make for connecting the control elements as will presently appear from the description that follows. At the inward end of the body 152, it is provided with a cylindrical recess 164 that will register with the orifice 166 of the porting block 100 to which the pump supply line 96 is connected. The recess 164 in cooperation with the orifice 166 are designed to enclose a resilient rubber-like ring that operates as a fluid seal and yet permits fluid flow from the pressure line 96 through the hole in the ring to a drill passage 168 joining a bore 170, that has a branch 172 opening into the bore 154 for a pressure control valve 174, and a branch 176 opening into the bore 156 for the distributor valve 178. These, as well as other drill passages, are started on the surface of the block where most convenient to locate the direction, and determine the extent for the proper fluid connections, and after drilling are in certain instances plugged at their starting ends to establish directed flow of fluid, such as indicated generally at 180. Extending from the bore 156 there are two other passages leading each to one of the bores 160 and 162 that house filter units 182 and 184 and terminate in orifices 186, 188 each recessed to receive a flexible seal ring and register with orifices 190 and 192 in the porting block 104 leading to the control passages 102 and 106 respectively. One of these passages includes a bore 194 starting from near the inner end of the bore 156 and extends across the block 152 to join a longitudinal bore 196 that opens into a second bore 198 that connects with the top end of the bore 160 for the filter unit 182 in the decrease pitch line. The other of those passages includes a bore 200 starting from near the out end of increase pressure port of the bore 156 to extend directly to the out end of the bore 162 for the filter unit 184 in the increase pitch line. A tap from the increase pitch line is made by bores 202, 204 and 206, 207 between the bore 162 and the bore 154 for the pressure control valve all as will be presently explained. Yet another bore 208 extends as a spill passage from the bore 154 to the bore 158 housing the governor spring 210. The physical structure for the connections is shown in Figs. 6 to 11, and the schematic and functional arrangement can be followed upon study of Fig. 12.

Figures 10, 11:
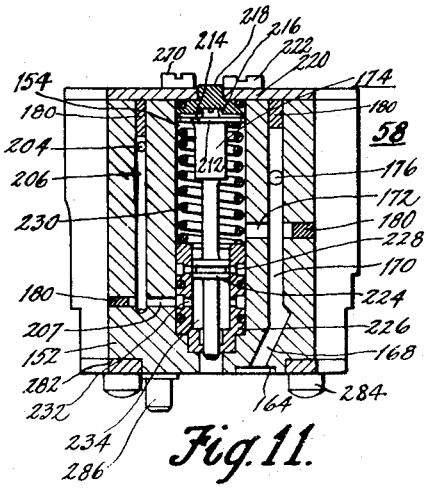
Fig. 10 is a sectional view of the unit through the control ports and associated filter devices substantially as indicated by the line and arrows 10—10 of Fig. 8.
Fig. 11 is a sectional view through the unit showing the pressure source port and the pressure control valve substantially as indicated by the line and arrows 11—11 of Fig. 8.

Reverting to a detailed description of the control elements, the pressure control valve 174 is shown in Fig. 11, and includes a plunger having a head 212 slidable in and substantially filling the cross-section of the bore 154, there being a notch 214 in its edge to form a bleed between the two sides thereof. A damping chamber 216 is thereby afforded between the head 212 and a plug 218 held in sealed relation within the end of the bore 154 by a keeper plate 220 secured to the body 152 by screw devices 222. Affixed at an intermediate point along the stem of the plunger there is a valve land 224 of small area and arranged to slide within a porting sleeve 226 having ports 228 communicating with the spill passage 208. A spring 230 disposed between the porting sleeve 226 and the head 212 of the valve normally assists centrifugal force to maintain the valve plunger in the outermost position of its travel, in which the damping chamber 216 is practically collapsed, and in which the land 224 closes off the ports 228 to the spill passage. When the propeller is operating, the pump pressure delivered to the bore 154 through 172 will be exerted on both sides of the head 212 and on only one side of the land 226, the latter of which opposes the combined force of the centrifugal and spring components thrusting the plunger outward. Thus as the pressure of the line increases, the spring 230 will be compressed and finally allow the land 224 to uncover the ports 228, whereupon the high pressure in the line and in the bore 154 is relieved through the spill passage. Due to the tap into the increase pitch control passage that is manifest through the passages 204, 206, and 207, additional resistance is offered to the pressure control valve blowing off at too low a pressure to effect a contemplated change of blade pitch. The porting sleeve 226 is provided with a second set of ports 232 opening to a chamber 234 behind the land 224 of the plunger; the ports 232 opening to the bore 207 such that the pressure of the pitch increase line may be applied to the opposite side of the land 224 in aiding relation to the spring 230 and the centrifugal force of rotation. By reason of these provisions, when the propeller is decidedly off speed, or some condition arises in which a quick and powerful change in blade pitch is needed the pressure regulating device will be temporarily increased in its maximum pressure limit to take care of the demands.

Figure 7:
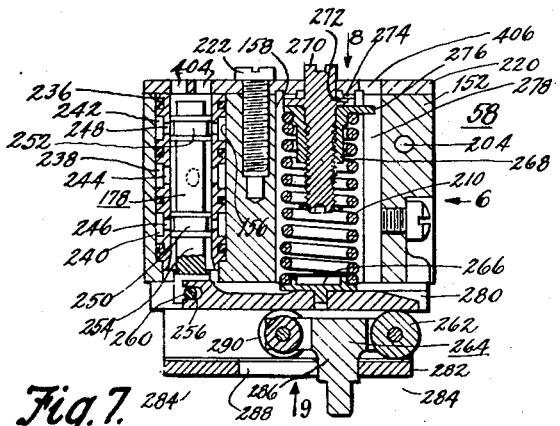
Fig. 7 is a longitudinal sectional view of the same substantially as indicated by the line and arrows 7—7 of Figs. 6 and 8.
Figure 6:
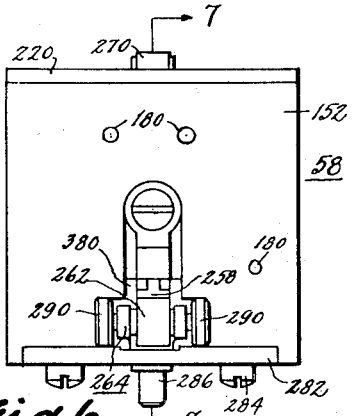
Fig. 6 is an elevational view of the control valve assembly, substantially as indicated by the arrow 6 of Fig. 7.
Figures 8, 9:
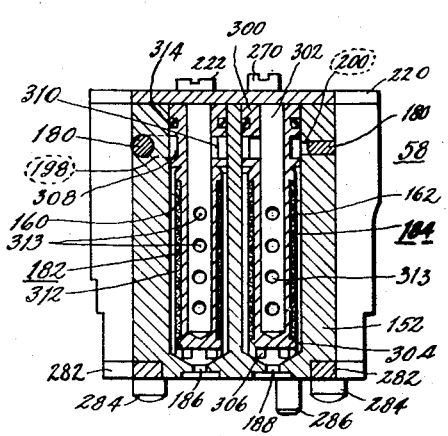
Fig. 8 is a top plan view of the unit substantially as indicated by the arrow 8 of Fig. 7.
Fig. 9 is a bottom plan view of the unit substantially as indicated by the arrow 9 of Fig. 7.

The pump pressure as measured by the pressure control valve 174 is conducted by the bores 170, 176 to the bore 156 of the distributor valve 178 shown in detail in Fig. 7 where a porting sleeve 236 fills the bore 156 and is retained in place by the keeper 220. The sleeve 236 is provided with three peripheral grooves 238, 240 and 242 that register with the openings to the bores 176, 194 and 200 respectively. Thus the pressure from the pump is always present in the groove 238 and by means of a port 244 through the porting sleeve is present in the bore of the sleeve 236. The sleeve 236 is also ported at 246 for the decrease pitch line, and at 248 for the increase pitch line. The body 152 is so arranged that the bores 156 and 154 are radially extensive of the axis of rotation of the propeller, and the bore of the porting sleeve 236 slidably receives the distributor valve of plunger 178 which has a pair of spaced lands 250 and 252 designed to register with and close off the ports 246 and 248 respectively when the valve plunger is in the equilibrium position. The valve plunger 178 has an axial extension 254 slit to receive the notched end 256 of a lever 258 engaging about a cross pin 260 in the slitted end of the valve plunger. The opposite end of the lever is supported on a movable fulcrum in the form of a roller 262 mounted on a carriage 264, and the intermediate portion of the lever supports a pad 266 operating as a seat for the governor spring 210, the other end of which engages a nut 268 carried by a stud 270 extending through the keeper plate 220, there being a flange 272 disposed in the bore 158 having radial ridges to cooperate with similarly disposed notches in the keeper as at 274 to act as a ratchet or detent prevented unwanted rotation of the stud. The nut 268 has a radially extending tongue 276 slidably retained within a groove 278 in the body 152 opening along the bore 158. By reason of those provisions the spring may be adjusted by rotating the stud 270 in and out of the nut 268. The body 152 has a cross channel 280 extending across the inner end thereof to form a housing for the lever and carriage, and the outer end of the cross channel is closed by a plate 282 as particularly shown in Fig. 9 where it is held in position by screw devices 284. The channel thus acts as a guide for and limits the movement of the carriage 264 which has a depending part 286 traversing a slot 288 in the plate 282 to mark the limits of carriage movement. Fixed to the carriage 264 there are rollers or wheels 290 that support the carriage within the cross channel and allow it to roll easily along the limits of the slot so that the fulcrum 262 may be selectively positioned along the lever 258 for setting the governor response at a selected speed level.

The carriage also supports a roller stop 292 that may be engaged by the lever when at the extreme of decrease pitch shift. Movement of the carriage is effected by means of the double lever 146 and 148 pivotally supported in the inner wall of the regulator housing as earlier described. In assembling the control valve assembly with the regulator housing the depending part 286 is registered with a slot 294 in the lever 146 so that oscillation of the lever 148 will effect the movement of the carriage along the governor lever 258. The lever 146 carries a pair of spacers or rubbing blocks 296 to assure that the lever will not be depressed into engagement with the regulator housing wall 82, when the unit is assembled within its socket. The porting blocks 100 and 104 are suitably recessed at 298 to receive with clearance the screw devices 284 so that a perfect fluid seal may be perfected between the body 152 and the porting blocks.

The governing valve in performing its function directs fluid pressure to one or the other of the ports 240 or 242 from the pressure port 244. If the directed pressure is through the port 240 it is applied through the bores 194, 196 and 198 to the bore 160 for the filter 182 of the decrease pitch pressure line. If the directed pressure is through the port 242 it is applied through the bore 200 to the bore 162 for the filter 184 in the increase pitch pressure line. Both of the filter units are identical such that a description of one will suffice for both. A spool member 300 is provided that closely fits the bores 160 and 162 and is long enough to extend the length thereof substantially as shown in Fig. 10. An end bore 302 of the spool leaves a closed end 304 with outside castellations 306 adapted to engage the end of the bores 160 and 162. A peripheral narrow groove 308 is so located as to register with the ends of the bores connecting with the distributor valve, and ports 310 through the spool connect the groove 308 with the bore 302. A considerable length of the spool is reduced to make a lodgement for a filtering screen 312, and a plurality of holes 313 account for fluid flow from the bore 302 to and through the screen. To prevent against leakage seal rings 314 are adopted and the filter units are retained within the bores by the keeper plate 220 heretofore mentioned.

When the units, that is, the pump unit 56 and the controller valve unit 58, are secured within their respective sockets and the covers are secured in place by the screw devices 122, the regulator housing forms a completely sealed unit, since there is afforded fluid seals at 316 between the covers and the unit nipples, at 140, for the pump shaft, and at 150, for the journal of the carriage shifting lever. A filler and drain opening is provided for the reservoir by a nipple 318 and screw plug 320. An access opening in the cap 120 for the control valve may be closed by a screw plug 322. That construction would normally leave the reservoir 54 without the possibility of pressure change to follow exterior pressure changes, since the reservoir is otherwise integrally bonded at its seams and junctures to prevent fluid leakage. A breather valve assembly 324 is therefore mounted in the cylindrical wall 76 of the outer housing member substantially as shown in Fig. 3, where a nipple 326 is radially disposed to threadedly receive a body member 328. The head 328 has a tubular extension 330 ending in an orifice 332 adjacent the inner flange 80 of the housing member. Housed within the extension 330 there is a needle member 334 urged by a spring 336 to close the orifice 332. The bore of the tubular extension 330 is closed by a plug 338 grooved at 340 to open into a cross passage 342 in the head 328. The plug 338 also forms a seat for the out end of the spring, and the breather unit when threaded into place extends into the branch 54a of the reservoir with the needle 334 disposed with its length radially of the axis of propeller rotation. When the propeller is rotating the reservoir is also rotating and the fluid content within the reservoir will be thrown by centrifugal force against the cylindrical wall 76 of the reservoir. Since it is customary to fill the reservoir only about half full with operating fluid, there will be no fluid in the region of the orifice 332 of the breather valve while the propeller is rotating. Due to the design and location of the breather valve, the needle 334 responds to centrifugal force at a predetermined speed to open the orifice 332, after which any differential of pressure between the inside and outside of the reservoir may be equalized by flow through the valve unit. Since the operating fluid is disposed along the cylindrical wall 76 away from the orifice of the valve unit the only flow through the valve unit will be of a gaseous content and not the operating fluid.

Actuator mechanism for the pump 56 and controller units 58 are provided as detailed in Figs. 1 to 4 inclusive, and incorporate an adapter assembly 350 concentric with the regulator and disposed between the regulator and the engine nosing. Secured within the flange 88 of the regulator housing member 74 there is a seating ring 352 adapted to seat the outer race 354 of a ball or other anti-friction bearing 356, which is held in place by a flange ring 358 and screw devices 360. A guard member 362 extends across the gap of the bearing to engage the inner race member 364 mounted on the outside of a pump driving gear 366. A spacer and guide ring 368 abuts the pump driving gear and provides a channel for reception of an adjusting ring 370 disposed between the guide ring 368 and a flange 372 of an adapter sleeve 374 which surrounds the sleeve nut 66 and extends the length of the regulator to telescopically engage within a lubrication seal 376 mounted on the planar wall 84 of the housing member 74. Screw devices 378 secure a clip 380 to the assembly and pass through the spacer 368 to thread into the pump driving gear 366 so as to secure those elements in rigid relation. Extending from the clip 380 there is an arm 382 adapted to engage a notch in a block 384 secured adjacent a piloting plate 386 mounted on the casing 10. Rotation of the propeller thus causes the regulator to rotate relative to the adapter assembly since the latter has a rotative bearing within the same by means of the anti-friction means 356, and is restrained against rotating with the propeller by the arm and notch linkage 382, 384. An arm 388 suitable for linkage to the cockpit of the craft is attached to the adjusting ring 370 as shown in Fig. 1, and plays along a notch in the guide ring 368 to oscillate the adjusting ring which has axially extending tongues 390 engaging within notches 392 of a sleeve 394 slidably mounted on the adapter sleeve 374. The sleeve also has a cam slot therein as shown at 396 that engages over a roller or pin 398 secured in the adapter sleeve 374, such that oscillation of the sleeve 394 by the adjusting ring 370 will effect movement of that sleeve axially of the adapter sleeve 374. Carried by the sleeve 394 there is a control ring 400 adapted to be traversed by a shoe 402 mounted on the end of the arm 148 for the governor carriage adjusting mechanism.

Any question of operation should now be clearly discernible by reference to Fig. 12 where the elements of the control system are shown in their functional relation and practically devoid of specific structure. It should be obvious that operating fluid picked up by the pump 56 is delivered to the distributor valve through the line 176, the pressure being limited by the valve 58 which controls the pressure in the line 176 to satisfy the demands of the devices to be operated by the governor valve. The operating fluid distributed by the governor valve goes to either the decrease pitch line 102 through the port 240 and the filter 182, or to the increase pitch line 106 through the port 242 and the filter 184. When the pressure is directed to the increase pitch line, and because that application meets with the natural tendency of the blade to shift to a decrease pitch position, there is a feed-back connection from the increase pitch port 242 to the pressure control valve 58 which tends to raise the blow-off limit and maintain a pressure potential suitable for the increased demand. The directed pressure by the governor valve thus reaches either the chamber 36 to force the piston 29 in a pitch decreasing direction, or the chamber 38 to force the piston in the opposite direction. Obviously, movement of the piston in one direction is made possible by the governor valve opening a relief to the other side through the other one of the control passages and filters. Thus when pressure is applied to the ports 240, venting of the torque unit is effected through the port 242 to the interior of the porting sleeve 236 and out through the openings 404 and 406 in the keeper plate 220 to the bore 158 for the governor spring, and thence to the reservoir 54. Movement of the arm 388 operates to select the speed level at which the governor mechanism will effect constant speed control of the propeller. Moving the fulcrum 207 along the lever 258 changes the relation of the moment arms through which the centrifugal force and the force of spring 210 act upon the valve and lever. The force of the spring remains substantially constant as determined on the ground by the stud 270, and always acts through the same moment arm except upon shift of the fulcrum to the feathering position, which is substantially that shown by the dotted lines in Fig. 12. The shift of the fulcrum can be accomplished while the propeller is rotating and when effected to the dotted line position so changes the force values acting on the valve and lever that the centrifugal and spring forces are now in aiding relation tending to move the valve plunger 178 against the increase pitch stop embodied in the keeper plate 220. The operating fluid will thence be directed to the chamber 38 regardless of the speed of propeller rotation, and will effect movement of the blades 20 to the edge on position.

Due to the fact that the pump and control unit are mounted in capsules that can be readily opened without disassembling the regulator, they can be easily and quickly repaired, cleaned, or replaced without suppressing the operation of the craft for hours or days as might otherwise be the case.

While the embodiment of the present invention as herein disclosed, constitutes a preferred form, it is to be understood that other forms might be adopted, all coming within the scope of the claims which follow.

What is claimed is as follows:

1. In a fluid pressure regulator for an aircraft propeller, the combination comprising, a pair of formed sheet metal rings telescopically engageable to provide an annular enclosure, means bonding the engaging portions of the rings to seal the enclosure into a fluid tight reservoir, radially extending sockets located in the outer wall of the enclosure, fluid pressure developing and control units located in the sockets, means connecting the units into a fluid circuit and caps covering the units and secured to the sockets in sealing relation.

2. In a fluid pressure regulator for an aircraft propeller, the combination comprising, a pair of formed sheet metal rings telescopically engaged to provide a pair of concentric spaced walls of a reservoir, means for sealing the engaging portions of the rings to render the reservoir tight against fluid leakage, socketed openings in the outer of the concentric walls, fluid pressure developing and control units disposed in the sockets with cap members enclosing the units for perfecting their inclusion within the sealed reservoir, means hydraulically connecting the units with the reservoir, and operating and adjusting means for the units extending through the inner one of the spaced concentric walls.

3. In a fluid pressure regulator for an aircraft propeller, the combination comprising, a formed sheet metal ring having a pair of cylindrical concentrically spaced walls, a second formed sheet metal ring having cylindrical flanges adapted to engage each a flange of said first ring, a tubage assembly secured to a wall of the first mentioned ring and connected with a motive device to be operated, sockets opening through the outer one of the ring walls, fluid pressure developing and control units secured in the sockets and adapted to register with porting blocks provided by the tubage assembly, operating means carried by the inner ring for coupling with the units, and means for sealing the engaging portions of the rings to render a fluid tight reservoir enclosing the fluid pressure developing and control units.

4. In a fluid pressure regulator for an aircraft, the combination comprising, an annular reservoir arranged concentric with an axis of rotation, for receiving a charge of operating fluid, radially extending tubular sockets circumferentially spaced about and opening into the reservoir, a fluid actuating unit mounted in one of the sockets and a fluid control unit mounted in an oppositely disposed socket, means for sealing off the sockets to enclose the units in exposed relation to the reservoir, a tubage assembly within the reservoir having porting blocks retained in registry with the units, and means extending through a wall of the reservoir for actuating both units.

5. The combination set forth in claim 4 wherein mounting of the units in the sockets and sealing off the sockets makes fluid circuit connections between the respective units.

6. The combination set forth in claim 4 wherein the fluid control unit comprises a compact assembly of a pressure regulating valve, a governor valve and fluid filter units hydraulically connected to fluid circuit ports.

7. The combination set forth in claim 4 wherein the fluid control unit comprises a body with longitudinal and cross bores housing and hydraulically connecting a pressure control valve, a fluid pressure directing valve and control passages with filters, and ending with fluid circuit ports.

8. The combination set forth in claim 4 wherein the fluid control unit comprises a body with longitudinal and cross bores housing and hydraulically connecting a pressure control valve, a fluid pressure directing valve and control passages with filters, and ending with fluid circuit ports, one of said control passages having a feed-back to the pressure control valve for increasing the pressure potential of the system in accordance with the demands of pressure force required at said control passage.

9. The combination set forth in claim 4 wherein the porting blocks of said tubage assembly axially space walls of the annular reservoir.

10. In a fluid circuit controller, a control valve assembly adapted for removable mounting in a peripheral wall of a regulator a capsule, mounted within the regulator and opening to the exterior thereof, said assembly comprising in combination, a cylindrical body disposed in the capsule and having longitudinal bores for chambering elements of a fluid controller apparatus, and cross bores for connecting the elements into the fluid circuit, a pressure control valve located in one of the longitudinal bores for limiting the line pressure to a normal value, a speed responsive governing valve located in one of the other longitudinal bores for directing the limited pressure to either of two other longitudinal bores, filter units in each of said two other bores, and a fluid connection between one of said two other bores and said pressure control valve for temporarily raising the limit of said line pressure above the normal pressure in accordance with the demands of said one bore when pressure is directed to it and a removable cap secured to the regulator over the opening for enclosing the control valve assembly.

11. Regulator apparatus for controlling pitch of propeller blades, said regulator comprising an annular sealed reservoir, a fluid pressure source, a fluid line in the reservoir for the pressure source, and means for controlling the fluid pressure comprising a valve body interposed in the fluid line, said body providing interconnected passages and valves for regulating and distributing the potential of said pressure source in accordance with deviations in speed of rotation from a selected speed level.

12. The combination set forth in claim 11 wherein the said body comprises a cylindrical block adapted to seat within a capsule for making connection with the fluid line, and has axially extending bores for housing said valves, with transverse bores for connecting the axial bores one with another and with the pressure source.

13. The combination set forth in claim 11 wherein the said body comprises a cylindrical block adapted to seat within a capsule for making connection with the fluid line, and has a plurality of axially extending bores for housing a pressure control valve, a distributing valve, and a pair of filter units, there being cross bores for appropriately connecting the pressure control valve with the distributing valve and for connecting all of the valves into the fluid pressure source.

14. The combination set forth in claim 11 wherein the said body comprises a cylindrical block adapted to seat within a capsule for making connection with the fluid line, and has axially extending bores for housing the valves including a pressure control valve, a distributing valve with control ports, and a feed-back from one of the control ports leading to the pressure control valve.

15. The combination set forth in claim 11 wherein the passages provided by the body include a pressure control passage housing a pressure control valve, a pressure distributing passage with control ports housing a distributing valve, a cross connection between one of the control ports and the pressure control passage, and filter passages housing filter units and connected with the control ports.

HOWARD CARSON.
MORRIS J. DUER.

REFERENCES CITED

The following references are of record in the file of this patent:

UNITED STATES PATENTS

| Number | Name | Date |
|---|---|---|
| Re. 4,492 | Brundred | Aug. 1, 1871 |
| 1,829,655 | Huguenin | Oct. 27, 1931 |
| 2,000,246 | Neely | May 7, 1935 |
| 2,307,102 | Blanchard et al. | Jan. 5, 1943 |